Aug. 19, 1924.
C. E. STROMQUIST
OIL BURNER
Filed July 3, 1922          2 Sheets-Sheet.
1,505,746
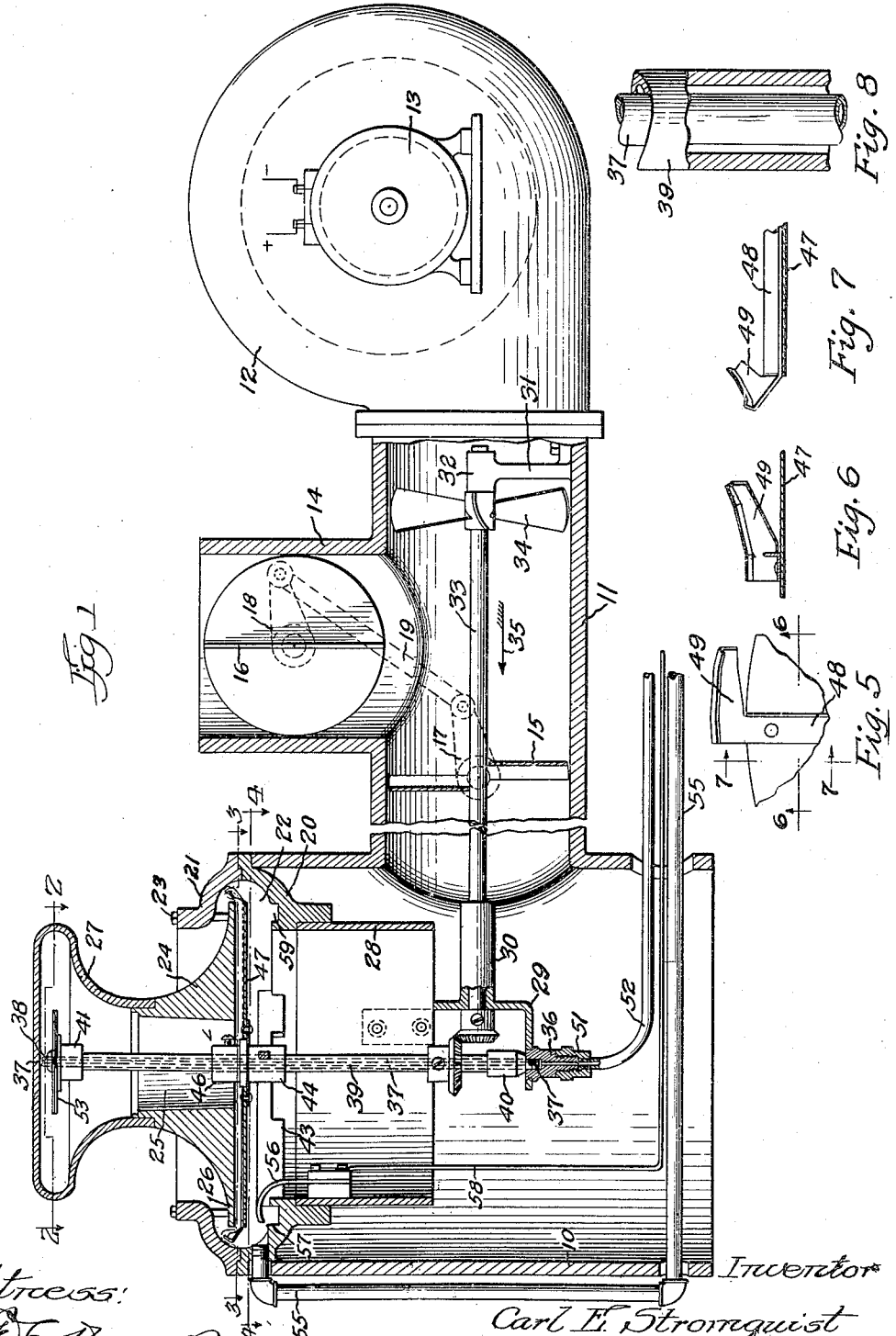
Witness:
Fred C. Iverson
Inventor
Carl E. Stromquist
By Casper L. Redfield Atty Aug. 19, 1924.

C. E. STROMQUIST 1,505,746

OIL BURNER

Filed July 3, 1922

Witness:

Inventor
Carl E. Stromquist
By Casper L. Redfield Atty.

Patented Aug. 19, 1924.

1,505,746

UNITED STATES PATENT OFFICE.

CARL E. STROMQUIST, OF CHICAGO, ILLINOIS, ASSIGNOR TO FRANK A. LUNDQUIST, OF CHICAGO, ILLINOIS.

OIL BURNER.

Application filed July 3, 1922. Serial No. 572,404.

*To all whom it may concern:*

Be it known that I, CARL E. STROMQUIST, a citizen of the United States of America, and a resident of Chicago, county of Cook, and State of Illinois, have invented certain new and useful Improvements in Oil Burners, of which the following is a specification.

My invention relates to oil burners designed to use comparatively heavy oil, and has for its object, improvements in such devices.

In the accompanying drawings—

Fig. 1 is a vertical section, partly in elevation;

Figs. 2, 3 and 4 are sections on lines 2—2, 3—3 and 4—4, respectively of Fig. 1; Fig. 2 being much enlarged;

Fig. 5 is an enlarged fragment of the device shown in Fig. 3;

Fig. 6 is a section on line 6—6 of Fig. 5;

Fig. 7 is a section on line 7—7 of Fig. 5; and Fig. 8 is a fragment showing the relationship of two pipes to each other.

Figure 3:
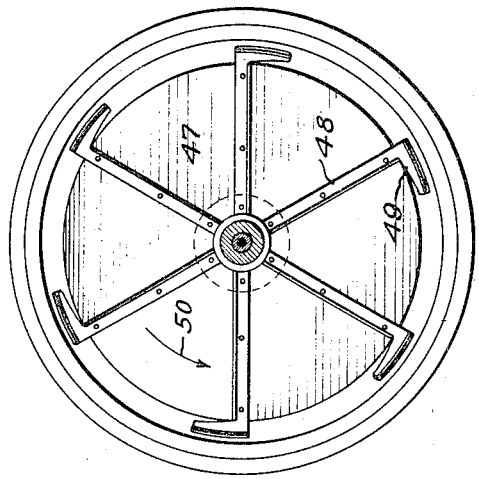
Figure 4:
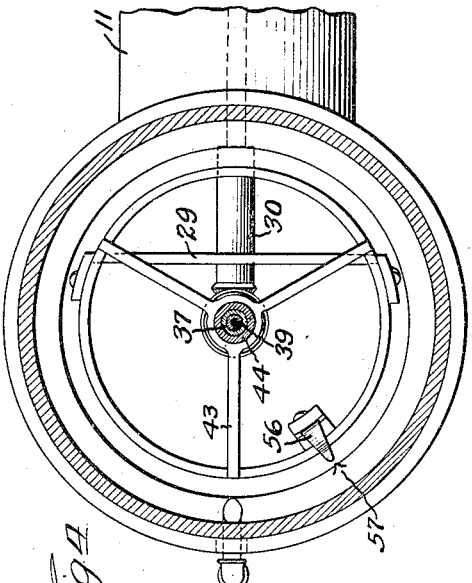
Figure 2:
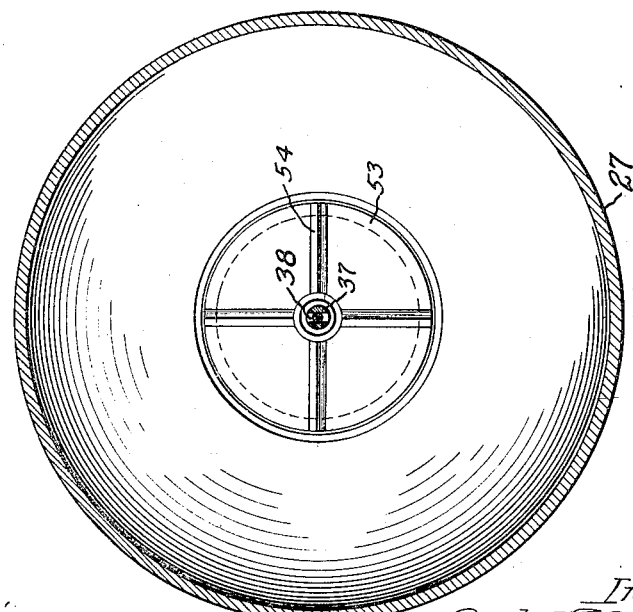

The casing 10 rests on a suitable foundation and has a long air channel 11 connected to its side. At the outer end of channel 11 is a blower 12 represented in outline, said blower being driven by a motor 13, or by any other convenient means. On one side of channel 11 is a branch channel 14. In channel 11 is a damper 15, and in channel 14 is a damper 16. On these dampers are cranks 17 and 18 connected together by a link 19. These parts are so arranged that when one damper is closed the other is open, or both may be at intermediate positions.

Resting on the upper part of casing 10 is a ring 20, and on this is another ring 21. These two rings provide an annular chamber 22 which has the form shown in Fig. 1.

Supported by bolts 23 in ring 21 is a block 24 which is in the form of a frustum of a cone having concave sides and an axial opening 25 therein. The lower edge of block 24 terminating in a flange 26 which projects into the annular chamber 22 and is of larger diameter than either the upper or lower outlets of said chamber. Mounted upon the upper end of block 24 is a hollow curved head 27, the curve of which joins the curve of block 24. The block 24 and head 27 form a gasifier of hour-glass shape.

Secured to the ring 20 is a tube 28, and secured to this tube is a bracket 29 which provides a bearing 30. In the channel 11 is a standard 31 providing a bearing 32. Supported in the bearings 30 and 32 is a shaft 33 having thereon a wind wheel 34. When the blower 12 is driven so as to force air thru channel 11 in the direction of the arrow 35, such air drives the wheel 34 to turn shaft 33.

Secured to bracket 29 is a head 36 into which is screwed a pipe 37 which pipe extends centrally up thru the block 24 and terminates near the top of head 27. Near the upper end of this pipe is a transverse hole 38.

Surrounding the pipe 37 is another pipe 39, having heads 40 and 41 on its ends. These heads are bored out to fit the outside of pipe 37 and form bearings which permit the pipe 39 to turn on the stationary pipe 37. Secured on the end of shaft 33 and on pipe 39, which is in fact a hollow shaft, are bevel gears 42 by means of which shaft 39 is driven when an air current drives wheel 34.

Mounted upon the ring 20 is a spider 43, the hub 44 of which serves as a bearing for the shaft 39. In fact, the pipe 37 and the tubular shaft 39 are held in vertical position by the head 36 into which the pipe is screwed and by the bearing 44 in which the shaft 39 turns.

Secured to the shaft 39 by a set screw 45 is a collar 46, and fast to this collar is a disk 47 which is of substantially the same diameter as flange 26, and is supported a short distance below it. On the upper face of disk 47 are a series of radially arranged angle irons 48 which terminate in vanes 49. These vanes are illustrated in Figs. 3, 5, 6 and 7, and their character is better understood by an inspection of the drawings than by detailed description. They project into the annular space 22, and beyond and above the flange 26. The disk 47 is driven in the direction of the arrow 50 of Fig. 3.

The head 36 has an axial opening, and on the exterior is a nut 51 which is connected to an oil supply pipe 52. The parts 36 and 51 are in the nature of a pipe union serving to connect supply pipe 52 to the upright pipe 37.

Secured on the head 41 is a disk 53 having raised portions or ribs 54 on its upper face.

A pipe 55 extends from any convenient source of heating gas and enters the chamber 22 as shown at the left of Fig. 1.

Secured on the tube 28 near the discharge end of pipe 55 is an insulated electrode 56, the end of which is near a point 57 on the ring 20. Wires 58 extend to a source of electricity and are provided with any convenient form of circuit closer. When the circuit is closed, an electric spark is produced at 57. If the circuit closer is of a make-and-break kind, then a series of sparks are produced.

In starting the device, the motor 13 is started so that the blower 12 will force a current of air thru channel 11. At this time the dampers 15 and 16 are in the position shown, with the result that most of the air flowing thru channel 11 is discharged thru the branch 14. The current of air, however, drives the wheel 34, and this in turn drives the shaft 39 and disks 47 and 53. At the time of starting the motor, or soon thereafter, the pipe 55 is opened so that gas will flow from the source and be discharged in the chamber 22. As the disk 47 is turning at this time, the vanes 49 act as paddles to make a combustible mixture out of the gas and air. This mixture is then ignited by a spark at 57. The resultant flame burns over flange 26 and around block 24 and under head 27.

After this gas flame has been burning a sufficient time to cause a preliminary heating of parts 24 and 27, oil is admitted thru pipes 52 and 37 and discharged thru opening 38 onto the upper face of disk 53. The oil then flows over the edge of disk 53 and falls upon the upper edge of block 24. If the disk 53 is turning with a fair degree of rapidity, the ribs 54 will give the oil a similar circular motion, the centrifugal force of which will carry the oil to the walls of head 27. After the parts become highly heated, the oil will be vaporized at this point, but at first it will largely flow downward and fall on the upper face of the revolving disk 47. As this disk also has ribs composed of the angle irons 48, the oil will flow outward along these ribs onto the vanes 49. These vanes trail to the rearward and are bent upward and slightly inward. The result is that oil flowing upon them in the manner described will be carried thru the flame and deposited on the upper face of flange 26. This will cause a full vaporization of the oil. If, however, some oil should fail to become vaporized by this operation it will drop down and run into the annular channel 59, from which place it may be drained away in any convenient manner.

During the operation described the dampers 15 and 16 will be gradually shifted so as to increase the flow of air into the casing 10 and shut it off from the branch channel 14. Air flowing into casing 10 will pass upward thru tube 28 and in an annular form will pass thru chamber 22. Here it meets a horizontal sheet of radially moving gas produced by vaporizing the oil which flows thru pipe 37 and over disk 53. The flame will be observed just above the edge of the ring 21, and the dampers may be adjusted for the proper flow of air by observing the flame.

What I claim is:

1. In a device of the class described, an annular chamber, a rotating disk located in said chamber, means for causing a current of air to flow thru said chamber and around the edges of said disk, a generator, means for conveying oil to said generator, and means for conveying gas and unvaporized oil from the generator to and over said disk to the current of air flowing around the edges of the disk.

2. In an apparatus of the class described, an annular chamber, a disk located in said chamber, means for causing a current of air to flow thru said chamber and around the edges of said disk, a gas generator, means for conveying gas and unvaporized oil from the generator to and over said disk to the current of air, and devices by which the current of air causes said disk to rotate.

3. In an apparatus of the class described, a gasifier of hour-glass shape, means for causing a current of air to flow around the base of the gasifier and toward the narrow part thereof, means for conveying oil to the interior of the gasifier and vapor from said oil horizontally into the current of air, and means for causing unvaporized oil to follow the same course and be delivered upon the exterior of the gasifier above the largest part thereof.

4. In an apparatus of the class described, a rotating disk, means for depositing oil upon the face of the disk, radial ribs on the disk and serving to cause the oil to partake of the rotary motion of the disk so that it will be moved outward by centrifugal force, and vanes upon which the outwardly moving oil is deposited, said vanes being so constructed and operated as to cause the oil to be moved inward at an elevation above the disk on which it flowed outward.

5. In an apparatus of the class described, the combination with a chamber having an enlarged top and contracted side walls, and arranged to have its exterior heated by the combustion of oil, of a pipe thru which oil is delivered to the interior of the chamber, a ribbed disk upon which the oil is deposited, and means for rotating said disk so as to deliver the oil uniformly upon the inner walls of the chamber.

6. In an apparatus of the class described, a chamber for the vaporization of oil, a disk located in said chamber, a shaft upon which the disk is mounted and by which it is rotated, means for delivering oil to the interior of said chamber thru the interior of the shaft and a second disk mounted upon the shaft and serving to determine the location of combustion around the vaporizing chamber.

7. In an apparatus of the class described, the combination with a chamber, arranged to have its exterior heated, of means for conveying a current of air to the heating surface, a pipe for conveying oil to the interior of the chamber, means operated by the current of air for distributing the oil upon the inner walls of the chamber, and means by which the gas formed in the chamber is projected into the current of air before it reaches the heating surface.

8. In an apparatus of the class described, the combination with a chamber, and arranged to be heated by an annular flame, a pipe for conveying oil to the interior of the chamber, and power devices for conveying air to the point of combustion and distributing oil upon the interior of the walls of the chamber, said chamber being so arranged that the discharged gas therefrom will be projected into the current of air adjacent to the point of combustion.

CARL E. STROMQUIST.